(12) United States Patent
Nagargadde et al.

(10) Patent No.: US 9,893,968 B1
(45) Date of Patent: Feb. 13, 2018

(54) TROUBLESHOOTING NETWORK PATHS IN A DISTRIBUTED COMPUTING ENVIRONMENT

(71) Applicant: Amazon Technologies, Inc., Reno, NV (US)

(72) Inventors: Aparna Nagargadde, Herndon, VA (US); Mark Edward Stalzer, Arlington, VA (US); Anish Sukumaran, Chantilly, VA (US)

(73) Assignee: Amazon Technologies, Inc., Seattle, WA (US)

( * ) Notice: Subject to any disclaimer, the term of this patent is extended or adjusted under 35 U.S.C. 154(b) by 340 days.

(21) Appl. No.: 14/037,299

(22) Filed: Sep. 25, 2013

(51) Int. Cl.
*H04L 29/06* (2006.01)
*H04L 12/26* (2006.01)

(52) U.S. Cl.
CPC .................. *H04L 43/0811* (2013.01)

(58) Field of Classification Search
CPC ..... H04L 43/0811; H04L 67/10; H04L 43/16; H04L 12/1827; G06F 11/1484; G06F 11/0712; G06Q 50/01; G06Q 10/10
See application file for complete search history.

(56) References Cited

U.S. PATENT DOCUMENTS

| | | | | |
|---|---|---|---|---|
| 6,819,655 B1 * | 11/2004 | Gregson | ................ | H04L 67/42 370/242 |
| 2006/0083165 A1 * | 4/2006 | McLane | ............. | H04L 12/2697 370/229 |
| 2006/0101308 A1 * | 5/2006 | Agarwal | ............. | G06F 11/0709 714/25 |
| 2010/0251002 A1 * | 9/2010 | Sivasubramanian | . | G06F 9/5061 714/2 |
| 2012/0233678 A1 * | 9/2012 | Pal | ........................ | G06F 21/445 726/7 |
| 2012/0303670 A1 * | 11/2012 | Gillen | ................... | G06F 9/5072 707/797 |
| 2013/0086203 A1 * | 4/2013 | Avner | ................. | G06F 11/3495 709/217 |
| 2014/0059392 A1 * | 2/2014 | Ren | ...................... | G06F 11/301 714/47.1 |
| 2014/0156826 A1 * | 6/2014 | Chang | .................... | H04L 45/02 709/224 |

* cited by examiner

*Primary Examiner* — Chris Parry
*Assistant Examiner* — Stephen Houlihan
(74) *Attorney, Agent, or Firm* — Davis Wright Tremaine LLP

(57) ABSTRACT

Remote computing resource service providers allow customers to reduce overhead by using computing resources shared with other customers. Customers communicate with the computing resources over a network, such as the Internet, these networks enable the use of remote computing resources but do experience errors. To ensure access to resources by the customer, a network troubleshooting service allows the customer to determine connectivity between computing resources and provides operations to the customer that when performed establish connectivity between computing resources. Furthermore, monitoring of connectivity once a connection is established ensures that the resources maintain connectivity.

24 Claims, 9 Drawing Sheets

TROUBLESHOOTING NETWORK PATHS IN A DISTRIBUTED COMPUTING ENVIRONMENT

BACKGROUND

The use of remote computing services, such as remote program execution and remote data storage, has greatly increased in recent years. Customers may reduce expenses and overhead by purchasing these services from a computing resource service provider. Customers of the computing resource service provider can communicate with computing systems, services and virtual machine instances which are widely distributed over many geographically dispersed networks. Customers, for instance, may communicate with computers of other customers to access and/or provide data while using services of a computing resource service provider. In many instances, customers configure and operate remote networks using hardware managed by computing resource service providers, thereby reducing infrastructure costs and achieving other advantages. Networks often span multiple geographic boundaries connecting with other networks and connection errors may occur at various points a long a communication path. With such configurations of networks and computing resources, ensuring connectivity between resources can be challenging, especially as the size and complexity of such networks grow.

BRIEF DESCRIPTION OF THE DRAWINGS

Various embodiments in accordance with the present disclosure will be described with reference to the drawings, in which.

DETAILED DESCRIPTION

Figure 1:
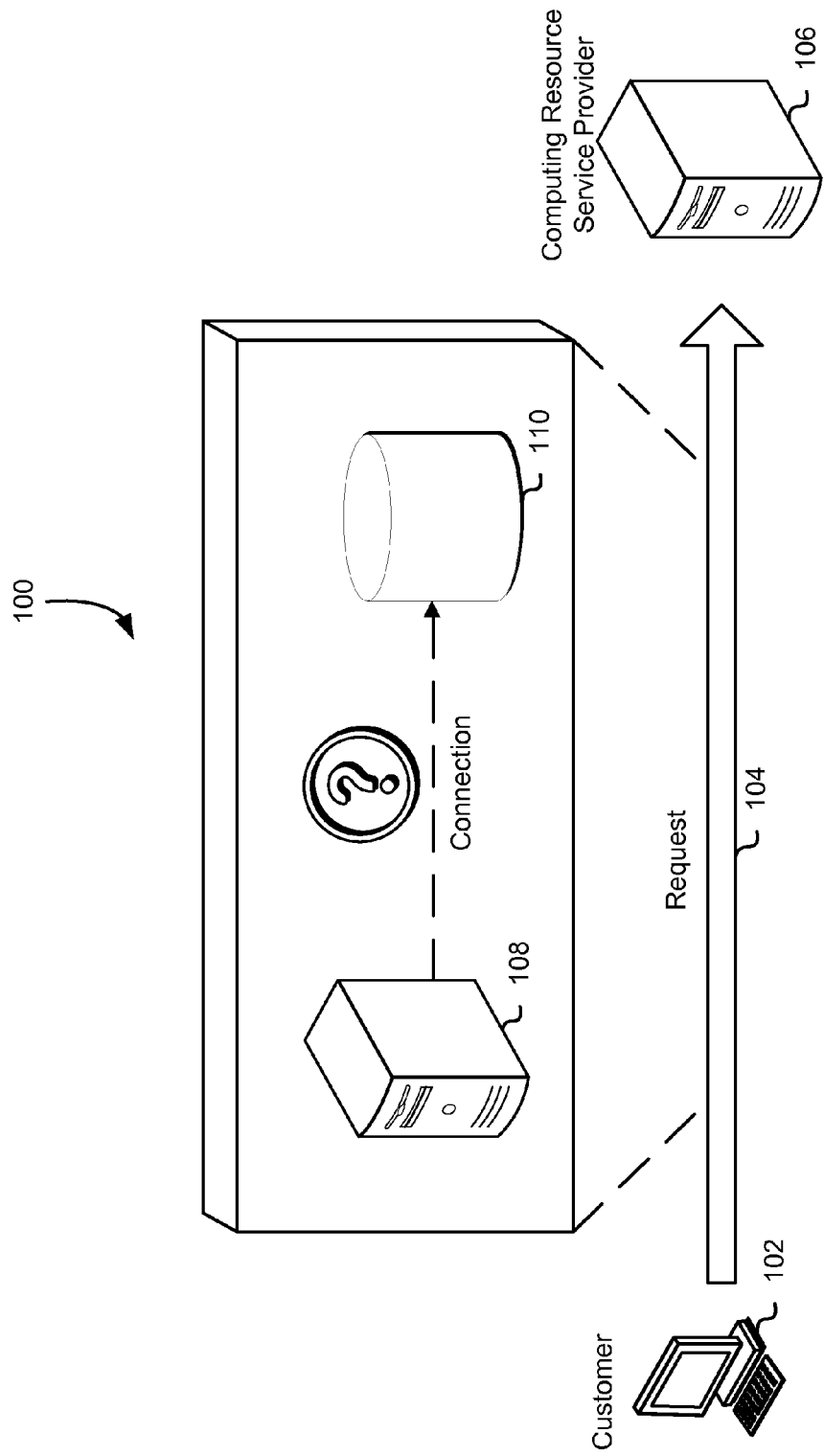
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for network troubleshooting services and network connectivity, enabling improved repair and maintenance of network paths between resources. In various embodiments, the customer interacts with resources operated by a computing resource service provider, the resources being communicatively coupled with one or more other resources. These resources may be communicatively coupled through one or more network paths in a service provider's data center and/or any other communications networks, such as the Internet. Furthermore, the resources may be devices in the network path such as a router, domain name system (DNS) server, switch, remote access server or any other device suitable for use in a network environment. In various embodiments, resources may also include applications, services provided by a computing resource service provider, virtual machine instances or any other suitable resource capable of communicating through a network connection.

In various embodiments, the customer may utilize the network troubleshooting service to determine connectivity information between two or more resources. The network troubleshooting service may, if no connection is found between the resources, provide the customer with information corresponding to operations, which when performed may establish connectivity between the resources included in the request. For example, the service provider may receive from the customer a request including two resources for which the service provider is to determine connectivity. The customer may interact with a management console operated by the service provider and, as a result of customer interaction, the management console may generate the appropriate application program interface (API) calls to determine connectivity between the resources. If the network troubleshooting service determines no connectivity between the resources, it may provide the customer with information illustrating how to establish connectivity between the resources.

Upon receipt of the request, the service provider may determine a network path between the two resources and for each of at least some layers of a protocol stack determine connectivity between the two resources. The protocol stack may be an open system interconnection (OSI) model or suitable networking model. At each layer of the protocol stack being analyzed, the network troubleshooting service may determine if a connection can be established at the particular layer of the protocol stack and if no connection can be established, determine a reason for the lack of connectivity. For example, the networking troubleshooting service may determine connectivity between a customer's virtual machine instance and a remote storage service by determining a network path between the two resources and for each layer of the OSI model determine connectivity. If no connectivity is determined at any layer of the OSI model the network troubleshooting service may return the corresponding error codes and operations to establish connectivity. The network troubleshooting service may return an error code to the customer that the virtual machine lacks the required permissions in order to access the remote storage service and provide operations on how to establish user permission for the remote storage service.

In various embodiments, the network troubleshooting service may establish and maintain a network graph with nodes representing computing resources and edges representing connections among the resources. The network graph may be used by the network troubleshooting service to determine a network path between two or more resources. The network graph may be established by querying devices on the network operated by the service provider in order to determine which devices on the network are communicatively coupled. For example, the network troubleshooting service may query one or more remote access dials in user service (RADIUS) server, authentication authorization and accounting (AAA) server or any other suitable management server in order to determine a network graph and may periodically send additional queries to one or more management servers to determine if a change has occurred in the network topology and update the network graph accordingly. In various embodiments, once a request is received the network troubleshooting service may determine if a network path exists between the two resources before testing connectivity for each layer of the protocol stack. If no network path exists between the resources the network troubleshooting service may return this information to the customer.

In various embodiments, once connectivity between two or more resources is established using the network graph, as described above, the customer may also provide a request to the service provider to monitor connectivity between two or more resources connected in the network graph. Similarly, as described above, the customer may provide the request through a web browser making the appropriate API calls. A network monitoring service may perform this function by executing connectivity tests between the two resources, collecting the results of the tests and analyzing the results. The connectivity test may include a flood ping, iperf, security administrator tool for analyzing networks (SATAN), penetration test, bwping, test tcp (ttcp), NESSUS®, Security Auditor's Research Assistant (SARA), System Administrator's Integrated Network Tool (SAINT) or other suitable network testing tools. In various embodiments, the network monitoring service may perform these tests on behalf of the customer or may prompt the customer to perform the tests themselves. For example, the customer may request that the network monitoring service monitor connectivity between computer system instances executing the customer's web server and log server. The network monitoring service may periodically perform one or more connection tests, such as the tests described above, collect the data in real time from various points along the network path and parse the collected data to determine the results of the connection tests. If the network monitoring service determines that connectivity between the two resources has been lost, the network monitoring service may notify the customer. A notification may be sent as an email, short message service (SMS) or other suitable notification system.

In various embodiments, the network monitoring service may also perform and/or aid the network troubleshooting service in troubleshooting network connectivity between two or more resources. For example, the network troubleshooting service may determine that there is connectivity between two resources however the customer may still report intermittent connection issues. The network troubleshooting service may then call the network monitoring service using appropriately formulated API calls, requesting that the network monitoring service monitor the resources in order to determine the cause and location along the network path of the intermittent connection issues. The network monitoring service may, in order to determine the cause of the connection issues, perform a series of connection tests, collect the results of the tests and analyze the results to determine the cause of the connection issues. In various embodiments, the customer may have access to only one of the two resources for which connectivity is to be determined. The network monitoring service may direct the customer to perform the series of network tests from the resource the customer has access to and collect the results of the test at some point along the network path between the customer's resource and the other resource for which connectivity is to be determined. The collected results may then be parsed by the network monitoring service for one or more error codes. In various embodiments, the results may be transmitted to the network troubleshooting service for analysis and the determination of one or more operations to remediate the connection issues. The error codes and operations to remediate the connection issues may then be forwarded to the customer using a notification service of the service provider.

FIG. 1 shows an illustrative example of an aspect of an improved network troubleshooting service in accordance with various aspects of the present disclosure. As noted above, the techniques described herein are applicable to monitoring and troubleshooting network connections, particularly in environments where network resources are operated by a computing resource service provider and customers may have limited information regarding the internal network of the service provider. Accordingly, FIG. 1 shows an example of the customer 102 transmitting a request 104 to the computing resource service provider 106. The request 104 may be transmitted over a network, such as the Internet. The request 104 may include multiple resources 108-110 for which connectivity information is to be determined. The customer 102 may generate the request using a computing device, such as a laptop, personal computer (PC), mobile phone or any other suitable device. The customer may interact with the computing device through a graphical user interface (GUI) and a web browser or other application in order to facilitate the creation and transmission of the request 104 to the service provider 106. For example, the customer 102 may use an application to communicate with the service provider 106, the application may display resources to the customer graphically. The customer 102 may use a pointing device, such as a mouse, to select two or more resources to include in the request 104 and the customer's computing device may determine identifying information for the resources selected and include the identifying information in the request to the service provider 106.

In various embodiments, the request 104 may be an API call or other suitable request capable of being transmitted over a network to the service provider 106. The request may include identifying information for two or more resources, such as a unique resource identifier, media access control (MAC) address, IP address or other suitable identifying information. In numerous embodiments, the request may also include information identifying an application or similar parameters for which connectivity between the resources is to be determined. Such a request may include identifying information for two or more resources and identify an application which is to communicate between the resources. For example, the request 104 may include information identifying two resources and an application; a customer's virtual machine instance executing LINUX® Operating System (OS), a remote structured query language (SQL) database and APACHE® webserver running on the virtual machine instance. The networking monitoring service of the service provider 106 may receive this information from the request 104 and determine connectivity between the two resources through the webserver. Other parameters included in the request may include communication ports, networking protocols or any other suitable parameter for which connectivity between the resources is to be determined.

In various embodiments, the network troubleshooting service maintains a network graph containing all the network devices in the service provider's network. Nodes in the network graph represent network devices, such as virtual machine instances, routers, services, servers or any other device capable of being connected to a network. Edges in the network graph represent connections between network devices in the service provider's network. In various embodiments, the network graph may include objects outside of the service provider's network. The network troubleshooting service may generate a network graph by requesting information from various network devices, collecting the information requested from the various devices and analyzing the collected information to determine network connections between devices on the network. For example, the network troubleshooting service may use simple network management protocol (SNMP) to discover routers, switches, servers, workstations, printers, modem racks, subnets and other suitable network devices on the network. From this information the network troubleshooting service may create a network graph which may be used to determine if a network path exists between resources. The network graph may be maintained and updated automatically when a new device is discovered in the network.

In various embodiments, once the request 104 is received by the service provider 106 the network troubleshooting service may identify the resources included in the request and determine, using the network graph discussed above, if a network path exists between the resources. If no path exists the service provider 106 may notify the customer 102 that there is no connectivity between the resources because no network path exists between the resources included in the request 104. If the network graph contains a path between resources 108 and 110 the network troubleshooting service may then test one or more layers of the OSI model to determine connectivity between the two resources. The network troubleshooting service may determine connectivity by determining for each layer of the OSI model, if the resources can communicate at the particular layer of the OSI model. In various embodiments, the network troubleshooting service may test each layer of the OSI model starting with layer 3 and progressing up to each successive layer. For example, the network troubleshooting service may cause a hypertext transfer protocol (HTTP) request on a particular port to be sent between the resources, then collect information corresponding to the request and analyze the information to determine if connectivity was established. The network troubleshooting service may also examine the networking interface of the resources, such as security policies of the resource, the routing table of the resource, IP address or other aspects of the resource's networking interface. Analyzing the collected information may include determining, if no connection was established, a cause for the lack of connectivity between the resources.

In various embodiments, once the network troubleshooting service has determined that there is no connectivity between the resources and the cause for the lack of connectivity, the network troubleshooting service may determine one or more steps that once performed establish connectivity between the resources. For example, if the network troubleshooting service collects information relating to the HTTP request and determines from the collected information that the request was denied due to a security policy in a firewall attached to the resource receiving the request, the network troubleshooting service may determine operations to change the security policy such that the two resources would be capable of communicating using HTTP over the desired port. In various embodiments, the operations must be performed by the customer, in which case information corresponding to the operation required to establish connectivity may be sent to the customer. However, if the operation required to establish connectivity may be performed by the service provider, the service provider may perform the operations automatically, establish connectivity between the resources and notify the customer that connectivity between the resources has been established. Performing operations to establish connectivity automatically may include performing the operations without a synchronous customer request in order to establish connectivity between resources.

Figure 2:
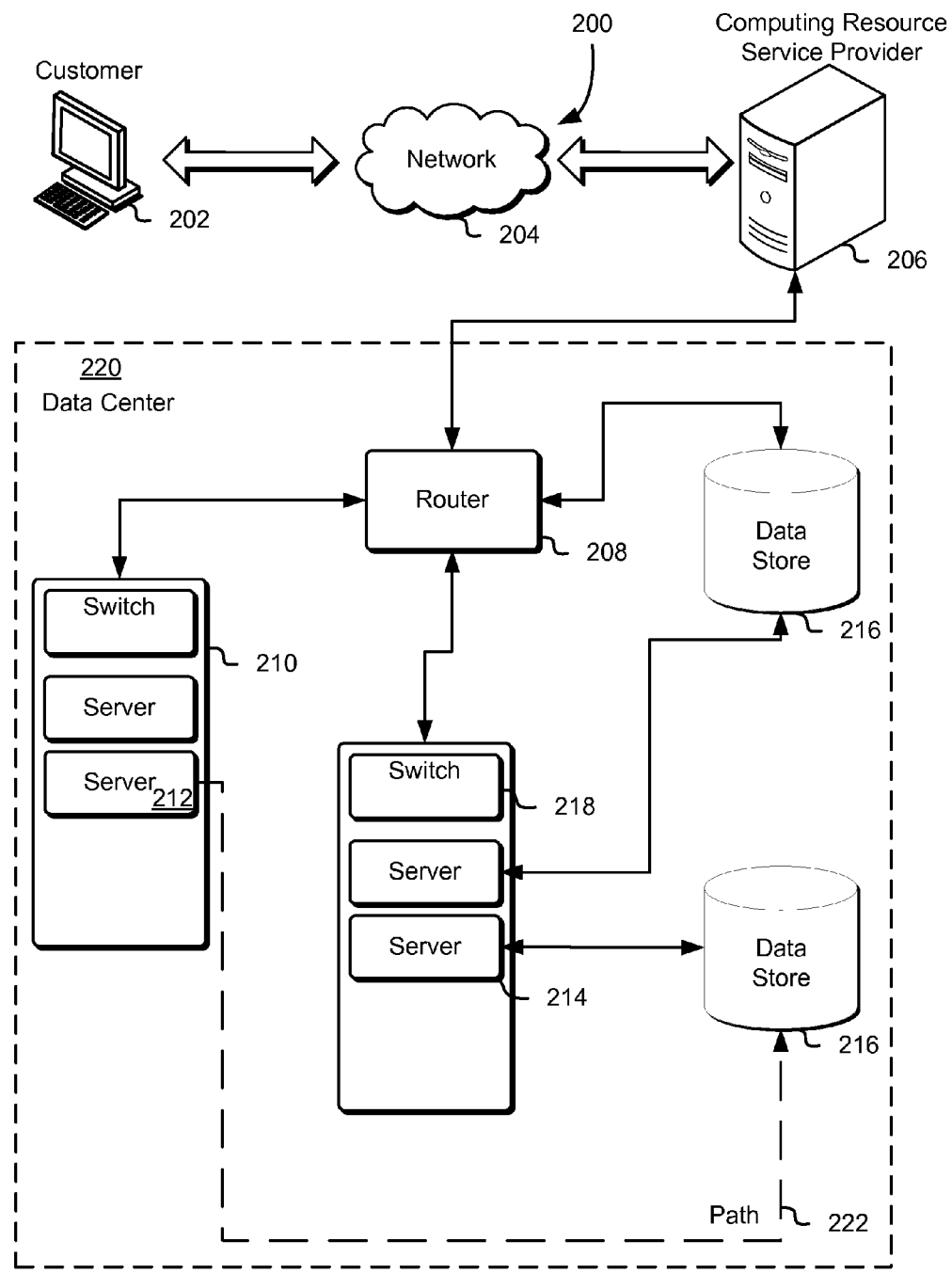
FIG. 2 shows an illustrative aspect of a computer resource service provider in accordance with at least one embodiment.

FIG. 2 depicts aspects of the computing resource service provider in accordance with at least one embodiment. The customer 202 may communicate with the computing resource service provider 206 over a network 204, such as the Internet. The service provider 206 may provide multiple services and resources to the customer 202, including remote data storage, remote program execution, virtual private networking and other computing services. The service provider 206 may operate one or more data centers containing physical resources, such as routers 208, server racks 210, servers 212-214, data stores 216 and switches 218. The routers 208, server racks 210, servers 212-214, data stores 216 and switches 218 may implement a variety of different protocols, as well as protocol unique to the particular device. In various embodiments there may be multiple network paths in the data centers, shown as arrowed connectors in diagram, for clarity not all possible connections in the data center 220 are shown. The router 208 may direct traffic inside the data center 220 as well as to other networks outside the data center. In various embodiments, networks outside the data center 220 may be other data centers operated by the service provider 206. The servers 212-214 may be one or more physical hosts located in a server rack in the data center 220 used to execute a variety of different applications. For example, the server 214 may execute a management application such as a RADIUS server or may execute a customer application such as a virtual machine instance. In various embodiments, the data stores 216 may be a service provided by the service provider such as remote data storage or they may be virtualized data storage for one or more virtual machines.

In various embodiments, the network troubleshooting service may be implemented using one or more servers 212-214. The customer 202 may transmit over the network 204 a network troubleshooting request including two or more resources, as described above, to the service provider 206. The router 208 may then direct the request to the corresponding server 212, executing the network troubleshooting service described above. Once the request is received, the network troubleshooting service may determine if a path 222 exists between the resources, shown as a dashed line in the diagram. The network troubleshooting service may determine if a path 222 exists between the resources by submitting appropriately configured API calls to the services or device managing the resources. In various embodiments the path 222 may be determined using a network graph, as described above. For example the network trouble shooting service may request information from the router 208, such as routing tables, or other information describing the configuration of the network inside the data center 220. This information may be combined with information collected from other devices in the data center 220 to generate the network graph. In various embodiments the network troubleshooting service may periodically send additional requests for information to devices on the network to determine if an update to the network graph is required. For example, as virtual machine instances are provisioned and de-provisioned on the servers 212-214 in the data center 220 the routing information inside the router 208 may be updated, the network troubleshooting service may request the updated information in order to maintain an accurate network graph.

In various embodiments, once the request to determine connectivity is routed to the network troubleshooting service, the network troubleshooting service may determine connectivity using information contained in the request. As described above, the request may contain two or more resources as well as application information for which connectivity is to be determined. The network troubleshooting service may first determine if a network path exists between the two resources. For example, the request received from the customer 202 may contain identifying information for two resources, a virtual machine instance running on a server 212 in the data center 220 and a data store 216. The network troubleshooting service may receive the request and determine according to the network graph if a path 222 exists between the two resources. If the path exists the network troubleshooting service may continue to determine connectivity between the resources and if no path exists the network troubleshooting service may terminate operation and return the result to the customer.

In various embodiments, once a path 222 is detected in the network graph the network troubleshooting service may send multiple requests to resources along the path in the data center 220. Information regarding the requests may be collected by the network troubleshooting service and parsed using one or more grammar rules to determine the results of the requests. For example, the results may indicate a particular layer of the OSI model in which an error occurred and a reason for the error. In various embodiments, the information regarding the collected results may be analyzed to determine if connectivity can be established and operations that may establish connectivity. Returning to the example above, if the virtual machine instance does not have permission to access the data storage 216, the network troubleshooting service may return this information to the customer along with information on how access permissions to the data store may be configured.

Figure 5:
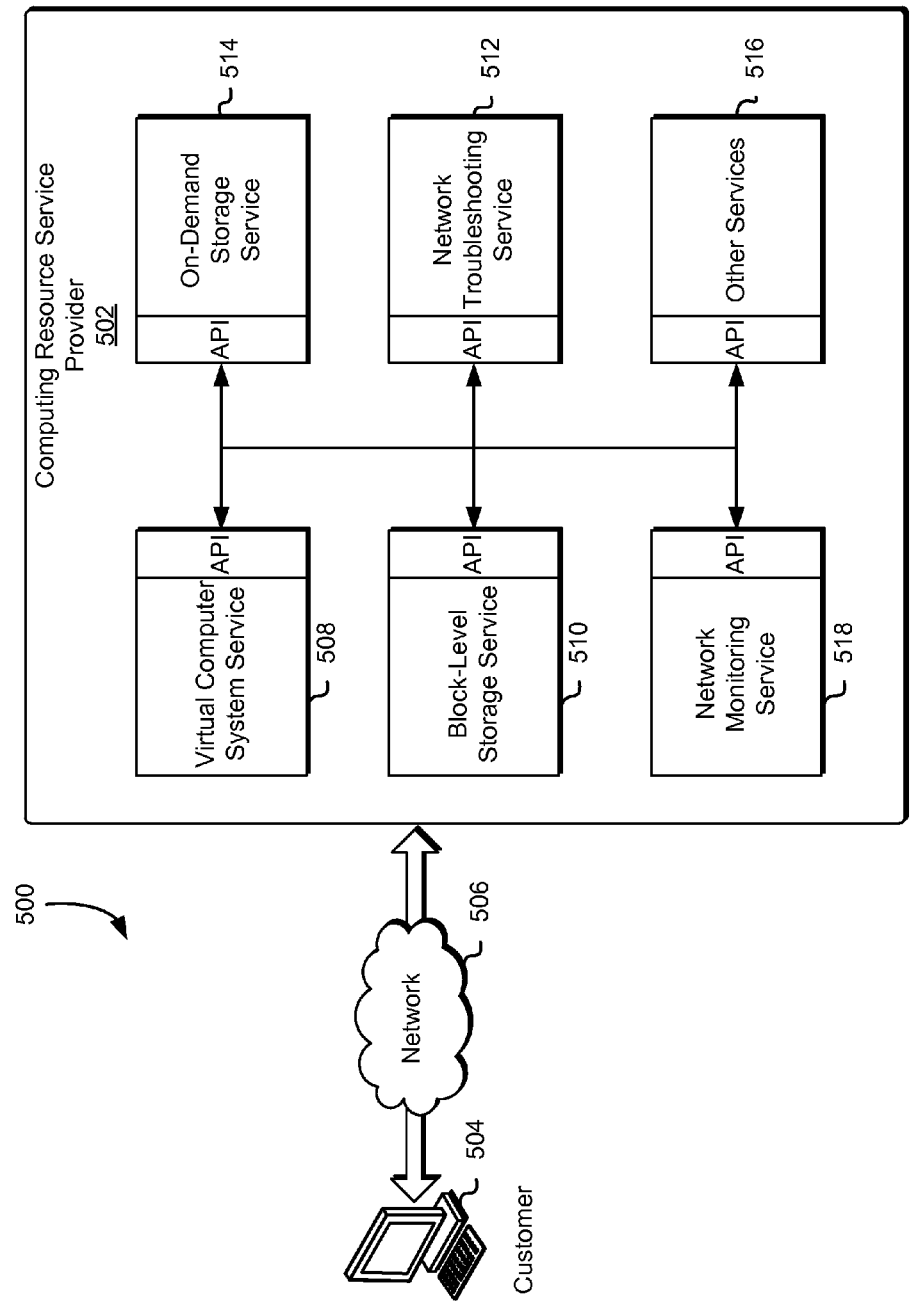
FIG. 5 shows an example of a customer connected to a computing resource service provider.

In various embodiments, the network troubleshooting service may be extended to include a network monitoring service, to be discussed in detail in relation to FIG. 5. For example, once a connection along the path 222 is established between resources the customer may request monitoring of the path 222 to ensure the two resources maintain connectivity. If connectivity is lost a notification may be sent to the customer 202, through a notification service, to be discussed in detail in relation to FIG. 5, operated by the service provider 206. In various embodiments, the network monitoring service may also be used to determine connection errors when connectivity between two resources exists but is periodically interrupted or other connection errors occur that may be difficult to discern. In various embodiments, the network monitoring service may receive a request to monitor connectivity between resources. For example, returning to FIG. 2, the network monitoring service may monitor the path 222 between a virtual machine instance executing on the server 212 and a data store 216 containing block-level storage for the instance. In various embodiments, the network monitoring service may also be used when the network troubleshooting service determines connectivity exists between resources but the customer may still receive connection errors. For example, the network troubleshooting service determines there is connectivity along path 222; however the customer may intermittently receive a connection error.

In various embodiments, the network monitoring service may provide the customer with one or more networking tests to execute and the network monitoring service may collect the results of the tests. For example, the network monitoring service may receive a request from the customer to monitor the connection between the customer's virtual machine instance executing on server 212 and remote data storage 216, as described above. The network monitoring service may notify the customer to execute a flood ping operation from the instance to the remote data store and monitor network traffic sent from the instance to the remote data store. The network monitoring service may collect information relating to the flood ping, parse the information and analyze the information to determine a cause for the error. This information may be returned to the customer and/or used to determine troubleshooting operations to remediate the connection error. In various embodiments, the network monitoring service may return the collected information to the network troubleshooting service, the network troubleshooting service may then parse and analyze the information to determine an error and remediation operations.

In numerous other embodiments, the network troubleshooting service may execute the one or more networking tests on behalf of the customer without requiring any customer action. Returning to the example above, the network monitoring service may execute the flood ping from the customer's virtual machine instance. In various embodiments, the networking tests executed by the network monitoring service may be executed from a resource not included in the request from the customer 202. For example, the networking test may be executed from a network management device on the path 222 between the resources or located on the same network as the resources. The results of the test may be collected directly from the resources or from listening devices or other resources on the data center 220 network, such as the switch 218. The network monitoring service may include continuously monitoring connectivity in real-time and returning information to the customer 202 if a connection error has occurred. The information may be returned using the notification service and include route metrics or other networking statistics.

Figure 3:
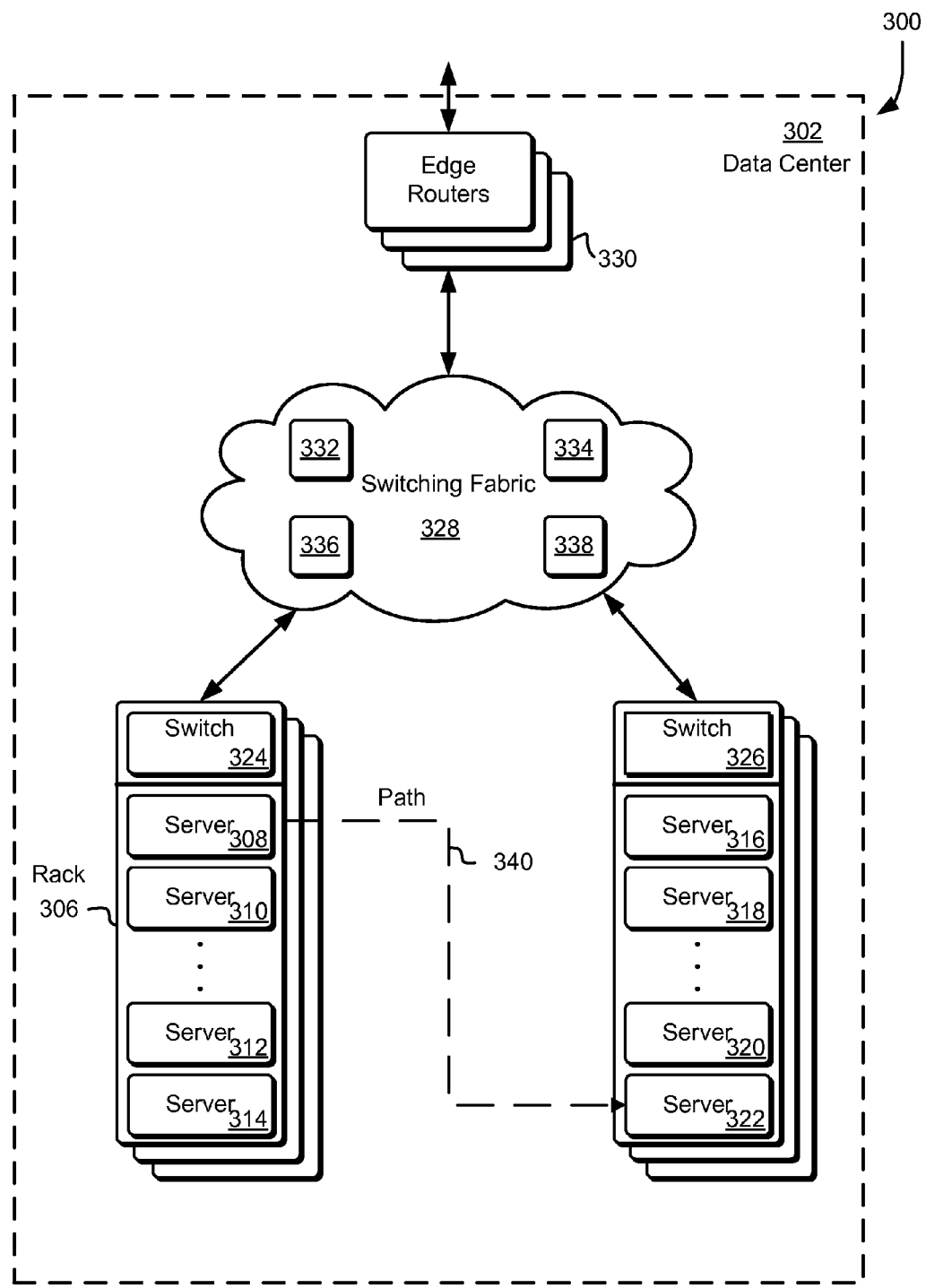
FIG. 3 shows a diagram illustrating aspects of a computer resource service provider in accordance with at least one embodiment.

FIG. 3 depicts aspects of data centers operated by the service provider in accordance with at least one embodiment. A data center 302 may include multiple server racks 306. The data center 302 is an example of one or more data centers that may be used to implement a computing resource service provider, such as the computing resource service provider described with reference to numeral 206 in FIG. 2. The server racks 306 located in the data center 302 may include any suitable number of server racks. Each server rack 306 may participate in maintaining services, such as electric power and data communications to multiple servers 308-314 and 316-322. The server racks 306 may include any suitable number of servers. The servers may be used for supporting the operation of virtual hosts, such as those described in reference to FIG. 2. For example, the servers 308-322 may include one or more virtual computing system service servers, one or more data store servers and/or one or more network troubleshooting services. In various embodiments the servers 308-314 may operate as the physical host for the network troubleshooting system. For example, the network troubleshooting system as described above may include one or more virtual machine instances executing the service residing on servers 308-314.

In FIG. 3, each server rack 306 is depicted as including a rack switch 324-326. The rack switches 324 and 326 may be responsible for switching packets of digital data to and from their respective sets of servers 308-314 and 316-322. In various embodiments disclosed herein, different services offered by the service provider may be located on different servers and it may be the responsibility of the rack switches to ensure information is exchanged correctly between services. For example, network troubleshooting service and network monitoring service may be located on different servers, which may require the rack switches to route information between the two, as in the example above where the information collected by the network monitoring service is transmitted to the network troubleshooting service for analysis. The rack switches 324-326 may be communicatively linked to a data center switching fabric 328 and then to a set of edge routers 330 that connects the data center 302 to one or more other computer networks including the Internet, which may be used for communicating with the customer and receiving requests from the customer. The switching fabric may include any suitable set of networking components including multiple interconnected switches 362-368 (for clarity, only four are shown in FIG. 3) of one or more switch types arranged in one or more switching layers, as well as routers, gateways, bridges, hubs, repeaters, firewalls, computers and suitable combinations thereof. In at least one embodiment, the rack switches 324-326 and the edge routers 360 are considered part of the switching fabric 328. Although a switching fabric is depicted in FIG. 3, other suitable network topologies may be used in the data center 302.

In various embodiments, the network troubleshooting service and the network monitoring service may be executed by one or more servers 308-322. The network troubleshooting service may receive a request from a customer to determine the connectivity of resources, the resources being located on servers 308-322 in the data center 302. Once the request is received, the network troubleshooting service may then determine if a path 340 in the data center 302 exists between the resources. For example, the network troubleshooting service may receive the request and execute a traceroute command from one resource included in the request to another resource included in the request. The network troubleshooting service may determine from the traceroute command if a path 340 exists between the two resources.

In FIG. 3, the resources included in the request may be resources executing on servers such as virtual machine instances, databases, webserver or any other application capable of being executed on a server. For example, servers 308 and 322 may be executing distinct virtual machine instances and the request may identify each particular virtual machine instance with a unique resource identifier. In various embodiments, the network troubleshooting service may determine the type of resource included in the request and perform different operations based upon the type of resources included in the request. For example, the network troubleshooting service may perform different operations to determine connectivity if the resource is a virtual machine instance executing on a server 308 or a service operated by the computing resources service provider, such as the service shown in FIG. 4 to be discussed in greater detail below. Returning to FIG. 3, the network troubleshooting service may receive a request to determine connectivity from a customer, upon receiving the request the network troubleshooting service may then determine if a path 340 exists between the resources.

In various embodiments, the network troubleshooting service may locate the path 340 between resources by looking up routing information from a router or similar device 332-338 in the switching fabric 328. In still other embodiments the network troubleshooting service may maintain a network graph as described above. Creation and maintenance of the network graph may be accomplished by polling routing devices 332-338 in the switching fabric 328, or one or more management servers 308-322 or any other resource in the service provider's 302 network which stores information regarding network connections between resources. In various embodiments the network graph may be created upon receipt of a request to determine connectivity. For example, the network troubleshooting service may receive a request to determine connectivity between resources and build a network graph once the request is received. The network troubleshooting service may also discontinue creation of the network graph once a path 340 is found between resources.

In various embodiments, once the path 340 is found between the resources the network troubleshooting service may then determine connectivity at various layers of the OSI model. The network troubleshooting service may test each layer individually or multiple layers concurrently. Returning to FIG. 3, the customer request may identify two virtual machine instances executing on servers 308 and 322, servers 308 and 322 may be connected by path 340 as determined by the network troubleshooting service. The network troubleshooting service may then perform specific tests on particular layers of the OSI model based on the information contained in the request and other information identifying the resources as virtual machine instances. For example, once the resource is identified as a virtual machine instance the network troubleshooting service may examine the network interface of the instance to determine connectivity. The network interface of the virtual machine instance may contain information about any virtual private network (VPN), firewall, gateway, or other network device that may be limiting connectivity between resources. If the network troubleshooting service determines that a connection between the two resources cannot be established due to the network interface, the troubleshooting service may provide the customer with operations to modify the network interface such that a connection between the resources can be established.

In various embodiments, the network troubleshooting service may determine a particular type of connectivity based on the received customer request. The request to determine connectivity between resources may specify a layer in the protocol stack, networking protocol and/or network port or range of network ports. For example, if the request specifies a networking protocol and one or more ports for which connectivity is to be determined, the network troubleshooting service may test only the networking protocol and ports provided in the customer request. If the request from the customer only specifies two or more resources for which connectivity is to be determined the network troubleshooting service may determine connectivity in a variety of layers of the protocol stack, networking protocols, network ports and applications. In various embodiments, the network monitoring service may monitor the connection along the path 340, as described above, in order to determine if connectivity has been lost.

Figure 4:
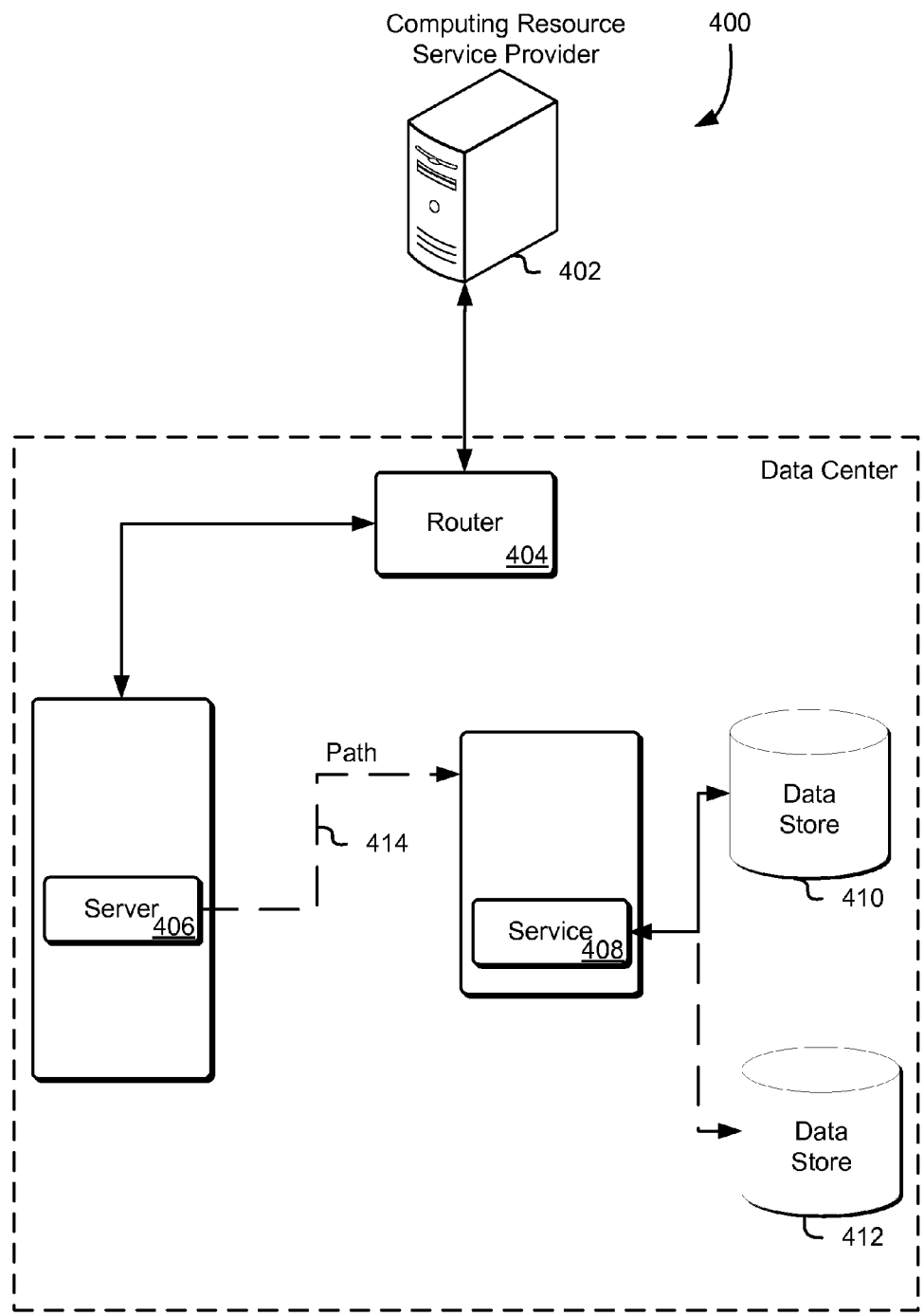
FIG. 4 shows a diagram illustrating aspects of a computer resource service provider in accordance with at least one embodiment.

FIG. 4 depicts aspects of the computing resource service provider in accordance with at least one embodiment. The computing resource service providers 402 may operate multiple data centers, such as those depicted in FIG. 3. The service provider data centers may provide physical resources for use by customers of the service provider. The data center may have one or more routers 404 or other devices capable of routing traffic inside the data center. The data center may have multiple servers and server racks, for simplicity only one server 406 is shown in FIG. 4. The data center may also have multiple services operated by the service provider, again for simplicity only one service 408 is shown in FIG. 4. In various embodiments, the network troubleshooting service may be implemented as a service 408. The services provided may include any of the services described in FIG. 5 below, such as a virtual computer system service or on-demand storage service. The data center may also include data stores 410-412, the data stores may be used by one or more servers 406 or services 408 in the data center. The data stores 410-412 may be a disk array or other device capable of storing data.

In various embodiments, the customer request to determine connectivity between resources may include one or more resources that are operated by a particular service 408 of the computing resource service provider 402 or the service 408 as such. For example, the service 408, included in the customer request, may be a block-level storage service operated by the service provider 402, or the customer request may include an identifier of a particular storage area of the block-level storage service. When the customer request identifies a particular storage area of the block-level storage service, the network troubleshooting service may communicate with a service management application in order to determine connectivity. For example, the network troubleshooting service may determine a path 414 to service 408, service 408 may manage resources 410-412 and all connections to those resources. The network troubleshooting service may also communicate with one or more other services to obtain information corresponding to at least one of the resources included in the customer request. Returning to the example above, once the network troubleshooting service has communicated with service 408 to obtain information about resources 410-412, the network troubleshooting service may then communicate with one or more other services, outside the network path 414, to obtain additional information regarding resources 410-412. The network troubleshooting service may determine the path 414 by querying devices on the network, such as by executing a traceroute or ping command on one or more devices on the network. The path 414 may include services or devices along the path or at end points of the path that are not operated by the service provider. In various embodiments, the resource 412 may be associated with service 408, the service 408 having an application program interface for interacting with the resource 412. The network troubleshooting service may send a request from server 406 to service 408 to access the particular area of storage included in the customer request. The network troubleshooting service may determine connectivity based on information returned from the request. For example, the service 408 may have a management application that controls access to storage areas based on resource identifiers and access policies associated with the resource identifiers. The network troubleshooting service may collect information from the service 408 to determine if connectivity between the resources may be established based on the access policies of the service. If the network monitoring service determines that a connection cannot be established due to access policies of the service it may return access policy information to the customer and include operations to define new access policies.

In various embodiments, the network monitoring service may monitor a connection between resources such a server 406 and a service 408 based on the customer request. As described above in reference to FIG. 2, the network monitoring service may perform one or more connection tests between the server 406 and the service 408, collect data corresponding to the test and analyze the data to determine if there is connectivity between the resources. In various embodiments, the network monitoring service may, in response to the customer's request to monitor resources, return one or more tests or operations to be performed by the customer, collect data corresponding to the customers actions and analyze the collected data. The network monitoring service may monitor path 414 to determine any change in network connectivity and notify the customer if there is a change in connectivity.

FIG. 5 shows an example of the customer connected to a computing resource service provider. The computing resource service provider 502 may provide a variety of services to a customer 504. The customer 504 may be an organization that may utilize one or more of the services provided by the computing resource service provider 502 to maintain and deliver information to its employees, which may be located in various geographical locations. The customer 504 may also utilize one or more of the services provided by the service provider 502 to execute one or more applications. Additionally, the customer 504 may be an individual that utilizes the services of the computing resource service provider 502 to deliver content to a work group located remotely. As shown in FIG. 5, the customer 504 may communicate with the computing resource service provider 502 through a network 506, whereby the network may be a communication network, such as the Internet, an intranet, or an Internet service provider (ISP) network. Some communications from the customer 504 to the computing resource service provider 502 may cause the computing resource service provider 502 to operate in accordance with one or more embodiments described herein or a variation thereof.

The computing resource service provider 502 may provide various computing resource services to its customers, the services may also implement application program interfaces to enable communication between the services. The services provided by the computing resource service provider 502 in this example include a virtual computer system service 508, a block-level data storage service 510, a network troubleshooting service 512, an on-demand data storage service 514, one or more other services 516 and a network monitoring service 518. It is noted that not all embodiments described herein include the services 508-518 of the computing resource service provider 502 and additional services may be provided in addition to or as an alternative to services explicitly described herein. Each of the services may include one or more web service interfaces that enable the customer 504 to submit appropriately configured API calls to the various services through web service requests. In addition, each of the services may include one or more service interfaces that enable the services to access each other (e.g., to enable a virtual computer system of the virtual computer system service 508 to store data in or retrieve data from the on-demand data storage service 514 and/or to access one or more block-level data storage devices provided by the block level data storage service 510).

The virtual computer system service 508 may be a collection of computing resources configured to instantiate virtual machine instances onto virtual computing systems on behalf of the customers 504 of the computing resource service provider 502. Customers 504 of the computing resource service provider 502 may interact with the virtual computer systems' service (via appropriately configured API calls) to provision and operate virtual computer systems that are instantiated on physical computing devices hosted and operated by the computing resource service provider 502. The virtual computer systems may be used for various purposes, such as to operate as servers supporting a website, to operate customer applications, or, generally, to serve as computing power for the customer. Other applications for the virtual computer systems may be to support database applications, electronic commerce applications, business applications, and/or other applications.

The block-level data storage service 510 may comprise one or more computing resources that collectively operate to store data for a customer 504 using block-level storage devices (and/or virtualizations thereof). The block-level storage devices of the block-level data storage service 510 may, for instance, be operationally attached to virtual computer systems provided by the virtual computer system service 508 to serve as logical units (e.g., virtual drives) for the computer systems. A block-level storage device may enable the persistent storage of data used/generated by a corresponding virtual computer system where the virtual computer system service 508 may only provide ephemeral data storage.

The computing resource service provider 502 may also include an on-demand data storage service 514. The on-demand data storage service 514 may be a collection of computing resources configured to synchronously process requests to store and/or access data. The on-demand data storage service 514 may operate using computing resources (e.g., databases) that enable the on-demand data storage service 514 to locate and retrieve data quickly so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 514 may be organized into data objects. The data objects may have arbitrary sizes except, perhaps, for certain constraints on size. Thus, the on-demand data storage service 514 may store numerous data objects of varying sizes. Data object identifiers may be included in customer request as a resource for which connectivity information is to be determined. The on-demand data storage service 514 may also be managed by a management application that maintains data object identifiers and access polices of the data objects. For instance, in some embodiments, the network troubleshooting service may communicative with the management application of the on-demand data storage service to determine connectivity between a resource and a data object. Access to the data storage service by a customer, another service or other entity may be through appropriately configured API calls.

The computing resource service provider 502 may additionally maintain one or more other services 516 based at least in part on the needs of its customers 504. For instance, the computing resource service provider 502 may maintain a database service for its customers 504. A database service may be a collection of computing resources that collectively operate to run one or more databases for one or more customers 504. Customers 504 of the computing resource service provider 502 may operate and manage a database from the database service by utilizing appropriately configured API calls. This, in turn, may allow a customer 504 to maintain and potentially scale the operations in the database. Other services include, but are not limited to, object-level archival data storage services, notification service, services that manage and/or monitor other services, and/or other services.

Figure 6:
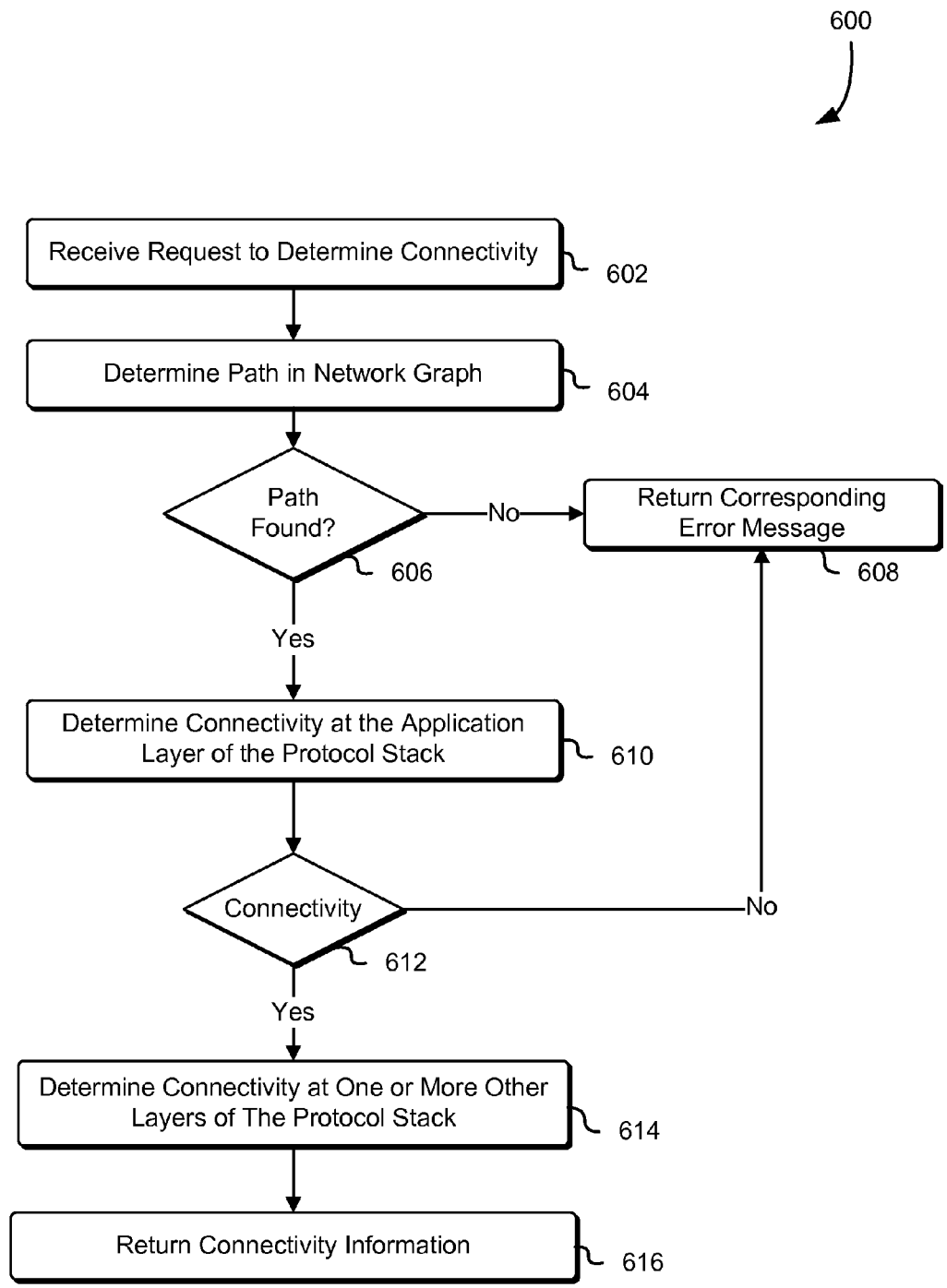
FIG. 6 shows an illustrative example of a process for troubleshooting network connectivity in accordance with an embodiment.

FIG. 6 shows an illustrative example of process 600 which may be used to determine network connectivity between multiple resources. The process 600 may be performed by any suitable system, such as by the computer resource service provider as described in connection with FIG. 5 and/or an appropriate component thereof, such as by the network troubleshooting service 512. Returning to FIG. 6, in an embodiment, the process 600 includes receiving a request from a customer to determine connectivity 602 between resources. The resources may be located in one or more data centers operated by the service provider as illustrated in FIG. 3. The resources include servers, virtual machine instances, computing devices, network devices, services of the service provider (defined above in reference to FIG. 5) or any other device which the customer may communicate with. In various embodiments, the network troubleshooting service may receive the request directly from the customer or another system on behalf of the customer through appropriately configured API calls, identifying at least two resources for which connectivity is to be determined. For example, another service operated by the service provider may generate the request on behalf of the customer, such as the management console as described above.

The network troubleshooting service may, upon receiving the request 602 from the customer, determine if a path in the network graph exists 604 between the resources. The network troubleshooting service may maintain a network graph containing information regarding all the resources in one or more data centers operated by the service provider. In various embodiments, determining a path 604 may include polling one or more resources of the service provider to determine a path between the resources included in the request 602. If a path is found 606 the process continues and attempts to determine connectivity between the resources in one or more layers of a protocol stack. However, if no path is found 606 between the resources an error message 608 is returned to the customer indicating that no path exists between the resources included in the request.

In various embodiments, if a network path is found 606 between the resources the network monitoring service or network troubleshooting service may determine connectivity between the resources at the application layer of the protocol stack 610. For example, the protocol stack may correspond to the OSI model and the network troubleshooting service may execute one or more networking tests to determine if connectivity at layer 7 of the protocol stack can be established 612. If there is connectivity the results of the connectivity test may be returned to the customer. However, if there is no connectivity at the application layer, the network troubleshooting service may return an error message 608 to the customer indicating the lack of connectivity. The returned error message 608 may include reasons for the lack of connectivity and operations to establish connectivity as described above. Once it is determined that there is connectivity at the application layer, the network troubleshooting service may attempt to determine connectivity at one or more other layers of the protocol stack 614. For example, the network troubleshooting service may attempt to determine connectivity at layer 4 of the protocol stack. In various embodiments, the attempt to determine connectivity at other layers of the protocol stack may fail because the protocol used by one or more resources at the particular layer of the protocol stack is proprietary and the resource receiving the connectivity request may be unable to decipher the request at the particular layer of the protocol stack. The information corresponding to connectivity as determined at the application layer 610 and the one or more other layers 614 may be returned 616 to the customer or one or more systems or services of the service provider such as the network trouble shooting service.

Numerous variations of the process 600 may be implemented in accordance with at least one embodiment of the present disclosure. For example, the network trouble shooting service may determine connectivity at various layers of the protocol stack starting with the highest layer and descending each layer of the stack until the lowest layer is reach. In other embodiments, the customer request may include a particular layer or layers of the protocol stack for the network troubleshooting service to determine connectivity at. The customer request, as described above, may include an application for which connectivity is to be determined and the network troubleshooting service may test only connectivity at the layer or layers at which the application operates. In various embodiments, the network troubleshooting service may return to the customer along with the error message 608, indicating an error preventing connectivity between the resources included in the request, operations to establish connectivity between the resources included in the request. The network troubleshooting service, in various embodiments, may at step 608 of process 600 submit an appropriately configured API call to the network monitoring service in order support troubleshooting operations.

Figure 7:
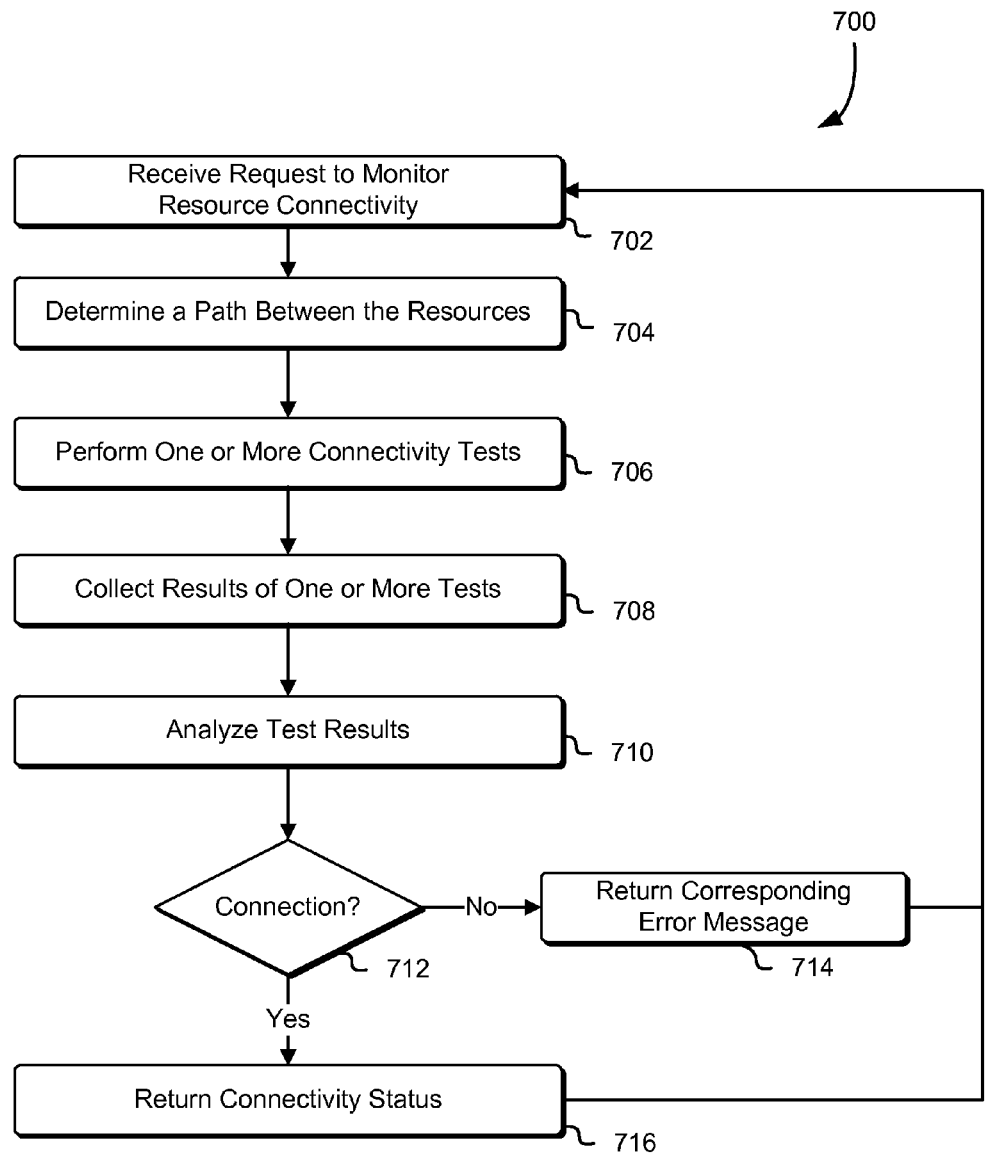
FIG. 7 shows an illustrative example of a process for monitoring network connectivity in accordance with an embodiment.

FIG. 7 shows an illustrative example of process 700 which may be used to monitor connectivity between resources that are connected through a network connection. The process 700 may be performed by any suitable system, such as by the computer resource service provider as described in connection with FIG. 5 and/or an appropriate component thereof, such as by the network monitoring service 518. Returning to FIG. 7, in an embodiment, the process 700 includes receiving a request to monitor connectivity between resources 702. In various embodiments, the resources may be resources that were provided to the network troubleshooting service and for which a connection established between the resources using the network troubleshooting service. Process 700 may also be initiated by the network troubleshooting service to determine why resources included in the request lack connectivity.

In various embodiments, a request 702 may be received by the network monitoring service and once received the network monitoring service may determine a path between the resources 704. The path may be determined using any of the techniques described above, for example, the network monitoring service may perform a traceroute on the resources included in the request. Once a path is determined 704, one or more connectivity tests 706 between resources are performed. The test may be performed by the network monitoring service, the customer or some other service provided by the service provider. Once performed, the results of the tests may be collected 708, the results may be collected by the network monitoring service. The collected results 708 are analyzed 710. In various embodiments, the analysis is done by parsing information collected regarding the results of one or more network connectivity tests as described above. In various embodiments, performing tests 706, collecting results 708 and analyzing the results 710 may be done continuously in order to monitor connectivity of resources.

In various embodiments, based on information collected from the analyzed tests results 710, the network monitoring service may determine if there is still a connection 712 between the resources. If connectivity is lost between the resources an error message 714 may be returned to the customer. In various other embodiments, if process 700 was initiated by the network troubleshooting service the analyzed results 710 and/or the corresponding error messages 714 may be returned to the network troubleshooting service. If there is still a connection 712 between the resources the connectivity status of the resources may be returned. In various embodiments the customer may indicate that notifications are to be sent only when a change in connectivity between the resources occurs in which case process 700 may not return a connectivity status 716. As noted, process 700 is iterative and additional requests may be processed as described above.

Figure 8:
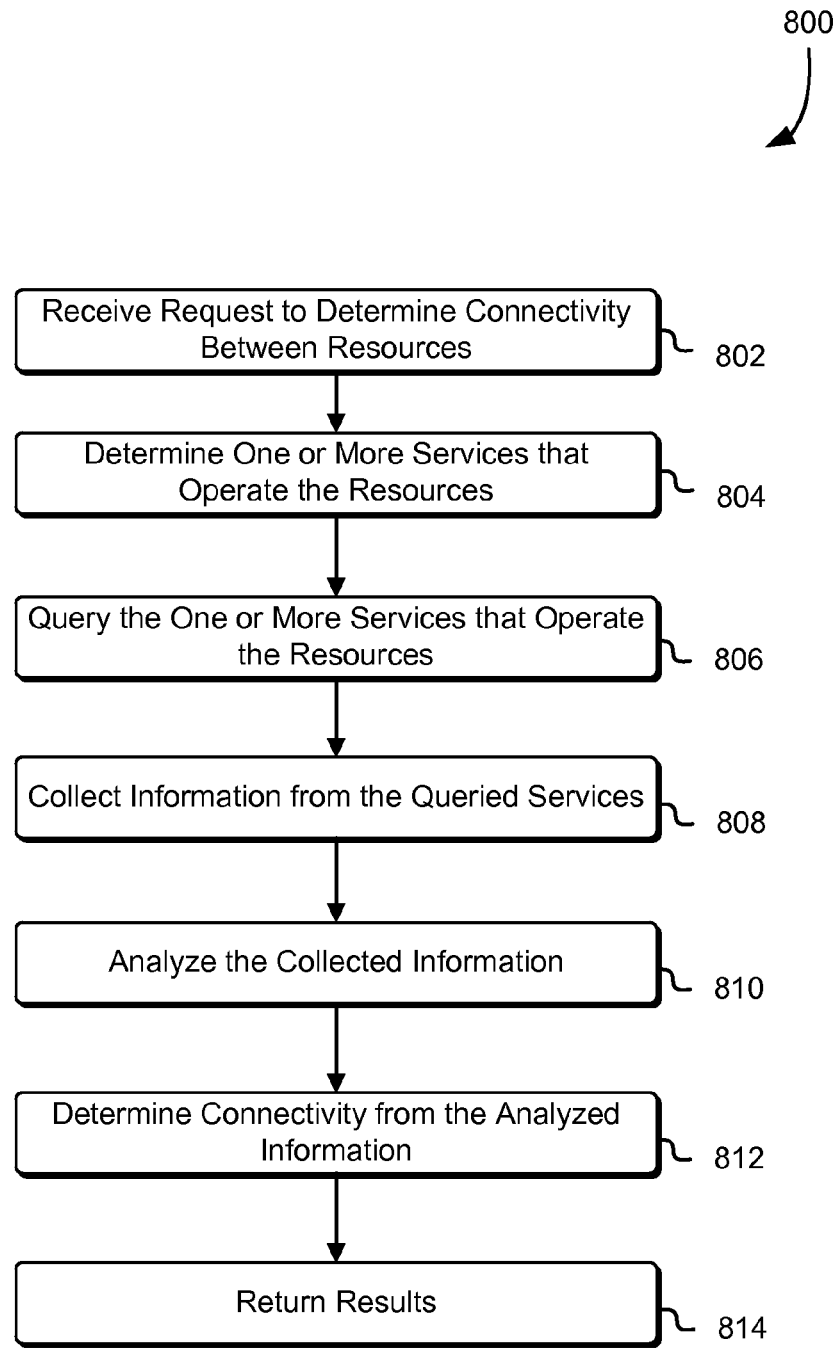
FIG. 8 shows an illustrative example of a process for monitoring network connectivity in accordance with an embodiment.

FIG. 8 shows an illustrative example of process 800 which may be used to monitor connectivity between resources that are connected through a network connection. The process 800 may be performed by any suitable system, such as by the computer resource service provider as described in connection with FIG. 5 and/or an appropriate component thereof, such as by the network monitoring service 518. Returning to FIG. 8, in an embodiment, the process 800 includes receiving a request to determine connectivity between two or more resources 802. The resources may be resources operated by or under the control of the service provider, a service of the service provider or another organization. The network monitoring service may then determine one or more services, including services provided by organizations besides the service provider, that control the resources included in the request 804.

The particular service that operates one or more resources included in the request may then be queried 806 for information regarding the particular resource or resources controlled by the service. The operator of the resource may define an application program interface for interacting with the service enabling query request to be transmitted to the service and defining responses to queries. For example, the request may include a remote data store operated by a service of the service provider, the network monitoring service may then determine which service controls the remote data store and query the service using the application program interface of the remote data store service in order to determine connectivity information regarding the remote data store. Information corresponding to the query may then be collected 808. The information may be included in a response to the application program interface call submitted by the network troubleshooting service.

The collected information 808 may then be analyzed 810 by one or more systems of the service provider. For example the returned information may be analyzed by the network troubleshooting service, described above in connection with FIG. 5. Analyzing the information may include parsing the responses from the one or more operated of the resources included in the request. Connectivity may then be determined based on the analyzed information 812. For example, the operator of the resource may return a response indicating that the customer does not have access to the resource based on the credentials submitted with the application program interface call submitted by the network troubleshooting service in order to request information about one of the resources included in the customer request. Returning to FIG. 8, the results of the determination may then be provided to the customer, the results may include information corresponding to the determined connectivity. For example, the customer may be provided with a reason why connectivity was not established such as a firewall or similar security device along the network path that is blocking connectivity at on a particular port. In various embodiments, operations that may be performed by the customer to establish connectivity between the resources included in the request are included in the returned results 814. Furthermore, the service provider may perform the operations to establish connectivity on behalf of the customer and return with the results 814 an indication that connectivity has been established.

Figure 9:
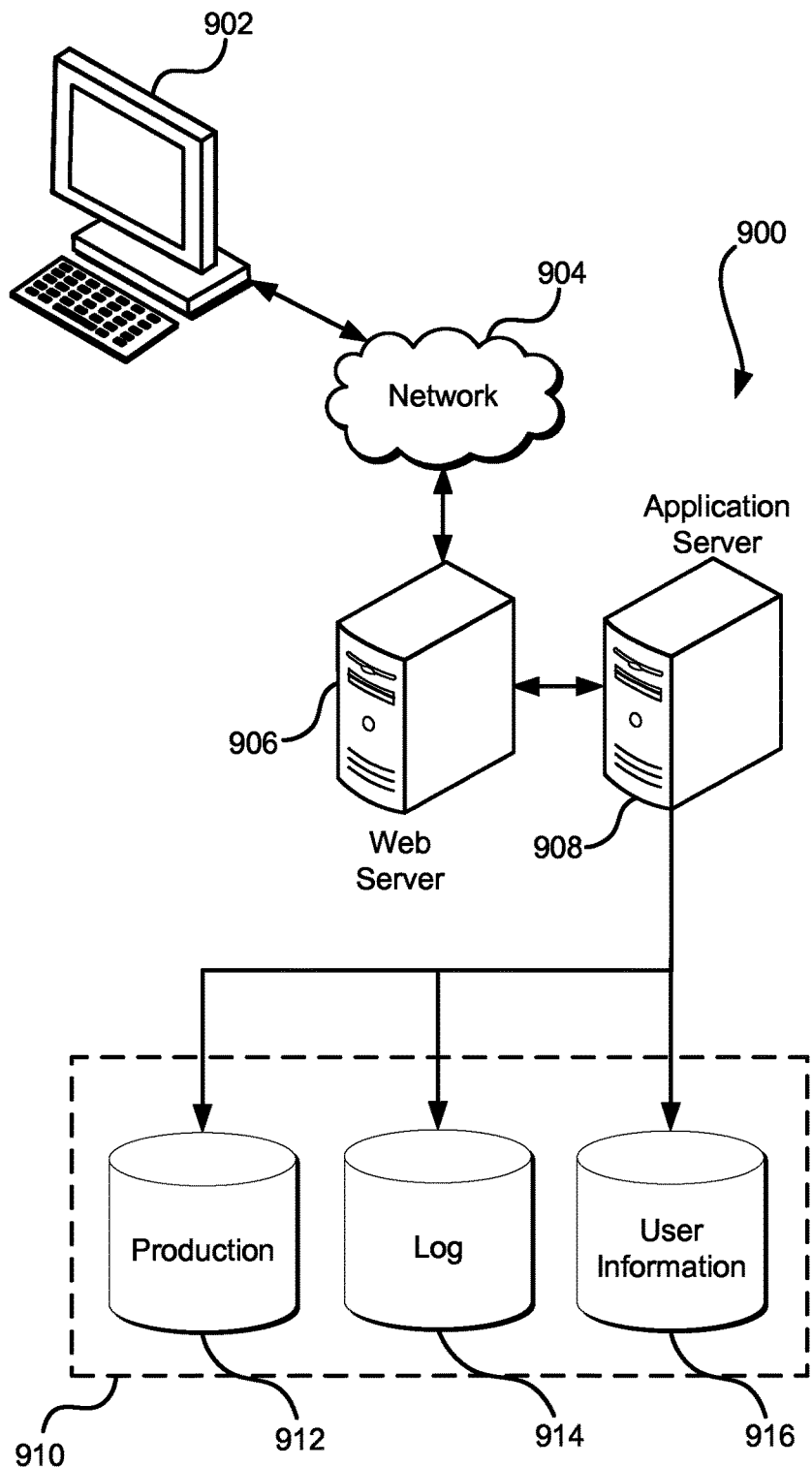
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 902 and the application server 908, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 910 can include several separate data tables, databases or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for troubleshooting network connectivity in a networked computing resource environment, the networked computing resource environment operated by a computing resource service provider, comprising:
    under the control of one or more computer systems configured with executable instructions,
        receiving, by the one or more computer systems and from a customer device, a first application programming interface call that encodes an identifier for a first resource, an identifier for a second resource, and a request to determine connectivity between the first resource and the second resource; and
        in response to the first application programming interface call, at least:
        generating, by the one or more computer systems:
            a second application programming interface call to a first service of the computing resource service provider hosting the first resource, the second application programming interface call requesting information regarding the first resource;
            a third application programming interface call to a second service of the computing resource service provider hosting the second resource, the third application programming interface call requesting information regarding the second resource; and
            a fourth application programming interface call to a third service requesting information regarding at least one of the first resource or the second resource, the fourth application programming interface call identifying the at least one of the first resource or the second resource and requesting additional information regarding the first and second resource, wherein the third service communicates with one or more other services outside a network path determined, based at least in part on a network graph, to exist between the first resource and second resource to obtain the additional information regarding either the first or second resource;
        in response to the one or more computer systems receiving the additional information from the third service, processing, by the one or more computer systems, at least information received by the one or more computer systems in response to the second and third application programming interface call regarding the first resource and the second resource and the additional information received by the one or more computer systems in response to the fourth application programming interface call so as to generate, by the one or more computer systems, a determination of one or more connectivity states between the first resource and the second resource; and
        providing, by the one or more computer systems to the customer device, information indicating the determination of the one or more connectivity states between the first and the second resource.

2. The computer-implemented method of claim 1, wherein:
the request to determine connectivity between the first resource and the second resource includes a request to monitor the connectivity between the first resource and the second resource; and
further comprising, in response to the request to monitor the connectivity between the first resource and the second resource, monitoring, by the one or more computer systems, the connectivity between the first resource and the second resource by at least:
performing, by the one or more computer systems, one or more connection tests between the first resource and the second resource to generate data corresponding to the one or more connection tests;
processing the data to generate a determination of connectivity between the first resource and the second resource; and
providing, in response to the request, the determination of connectivity.

3. The computer-implemented method of claim 1, wherein providing, in response to the request, information indicating the determination of the one or more connectivity states between the first and the second resource includes indicating operations to establish connectivity between the first resource and the second resource.

4. The computer-implemented method of claim 1, wherein the request to determine connectivity between the first and the second resources specifies an application executing on a resource of the computing resource service provider for which connectivity between the first and second resource is to be determined.

5. The computer-implemented method of claim 1, wherein providing the information indicating the determination of the one or more connectivity states between the first resource and the second resource includes applying one or more operations to establish connectivity between the first and second resources without a synchronous customer request to apply the operations to establish connectivity between the first resource and the second resource.

6. The computer-implemented method of claim 1, wherein processing the information regarding the first resource and the second resource so as to generate the determination of the one or more connectivity states between the first resource and the second resource exists includes, as a result of determining that the first resource and the second resource have a connecting path:
determining connectivity of the first resource and the second resource at a first level in a protocol stack; and
in response to determining connectivity exists between the first resource and the second resource at the first level in the protocol stack, determining connectivity of the first resource and the second resource at a second level of the protocol stack.

7. The computer-implemented method of claim 6, wherein:
the protocol stack is in accordance with an OSI model; and
the customer device is a separate resource from both the first resource and the second resource.

8. The computer-implemented method of claim 1, wherein generating the determination of the one or more connectivity states between the first resource and the second resource exists includes determining if a firewall is preventing access between the first resource and the second resource.

9. A system, comprising:
a data processing subsystem comprising a collection of computing resources configured to implement one or more services, wherein the one or more services are collectively configured to:
in response to receiving a request for connectivity data, the request specifying a first resource and a second resource, at least:
querying, by the one or more services, a first service that hosts the first resource in order to obtain information about the first resource;
querying, by the one or more services, a second service to obtain additional information about the first resource, wherein the second service communicates with one or more other services, outside a network path usable by the first service to obtain the additional information;
in response to the one or more services receiving additional information from the second service, processing, by the data processing subsystem, at least the information and the additional information to generate a determination whether connectivity between the first resource and the second resource exists; and
providing, by the one or more services, the connectivity data indicating at least the determination.

10. The system of claim 9, wherein querying the first service that hosts the first resource in order to obtain information about the first resource further includes querying at least one additional service in order to obtain information about at least one of the first or the second resource.

11. The system of claim 9, wherein:
the request that specifies the first resource and the second resource includes a request to monitor a connection between the first resource and the second resource; and
the one or more services are further configured to at least monitor the connection between the first resource and the second resource by at least:
causing information to be transmitted between the first resource and the second resources;
collecting data corresponding to the information transmitted between the first and the second resources; and
determining connectivity between the first and the second resource.

12. The system of claim 9, wherein generating the determination whether connectivity between the first resource and the second resource exists includes:
checking connectivity between the first resource and the second resource on a network path at a first level of a protocol stack; and
in response to determining connectivity exists between the first resource and the second resource on the network path at the first level of the protocol stack, determining connectivity of the first resource and the second resource at a second level of the protocol stack.

13. The system of claim 12, wherein querying the first service that hosts the first resource in order to obtain information about the first resource includes querying the first service that hosts the second resource in order to obtain information about the second resource.

14. The system of claim 9, wherein generating the determination whether connectivity between the first resource and the second resource exists includes processing one or more policies accessible to the one or more services to determine whether the one or more policies prevent access to the first resource by the second resource.

15. The system of claim 9, wherein querying the first service that hosts the first resource in order to obtain information about the first resource includes generating, by the one or more services, an application programming interface request to the first service.

16. The system of claim 9, wherein generating the determination whether connectivity between the first resource and the second resource exists includes determining a configuration of a networking interface of at least the first resource.

17. The system of claim 9, wherein generating the determination includes-performing one or more operations to establish connectivity between the first resources and the second resources without a synchronous customer request to apply the operations to establish connectivity between the first resource and the second resource.

18. A non-transitory computer-readable storage medium having stored thereon instructions that, when executed by one or more processors of a computer system, cause the computer system to:
   determine connectivity between at least two resources specified in a request for connectivity data, by at least:
      querying a first service that hosts a first resource of the at least two resources to obtain information about the first resource;
      querying a second service to obtain additional information about the first resource, wherein the second service communicates with one or more other services, outside a network path usable by the first service to obtain the additional information;
      in response to receiving additional information from the second service, processing at least the information and the additional information to generate a determination whether connectivity between the first resource and a second resource of the at least two resources exists; and
   providing the connectivity data indicating at least the determination.

19. The non-transitory computer-readable storage medium of claim 18, wherein generating the determination includes monitoring, for a predetermined period of time, the at least two resources to determine if connectivity has been lost.

20. The non-transitory computer-readable storage medium of claim 18, wherein the request for connectivity data includes, as a parameter to the request information corresponding to an application or networking protocol operating in connection with at least one of the at least two resources.

21. The non-transitory computer-readable storage medium of claim 18, wherein:
   generating the determination includes determining a network path between at least two of the at least two resources at a first layer of a protocol stack; and
   for each layer of the protocol stack above the first layer of the protocol stack, checking connectivity between the two resources.

22. The non-transitory computer-readable storage medium of claim 21, wherein:
   the first layer of the protocol stack is layer two of an OSI model; and
   each layer of the protocol stack above the first layer is layer three or higher of the OSI model.

23. The non-transitory computer-readable storage medium of claim 18, wherein generating the determination is based at least in part on an access policy of a resource of the at least two resources.

24. The non-transitory computer-readable storage medium of claim 18, wherein generating the information about the at least two resources further includes transmitting an application program interface call to an additional service.

* * * * *